Patented Dec. 15, 1931

1,836,857

UNITED STATES PATENT OFFICE

WILLI LUDWIG, OF HOCHST-ON-THE-MAIN, AND OTTO SCHAUMANN, OF WIESBADEN, GERMANY, ASSIGNORS TO WINTHROP CHEMICAL COMPANY INC., OF NEW YORK, N. Y., A CORPORATION

PHYSIOLOGICALLY ACTIVE EXTRACTS AND PROCESS OF PREPARING THE SAME

No Drawing. Application filed October 6, 1927, Serial No. 224,517, and in Germany October 20, 1926.

Our present invention relates to physiologically active extracts and process of preparing them.

In the publications of the investigations of Haberlandt (see for instance Pflüger's Archiv, Band 212) a harmone of the heart-movement has been described. This author uses as parent material hearts of cold-blooded animals and thereby obtains extracts which are soluble in alcohol. However nothing has hitherto been published regarding the usefulness of these extracts for practical purposes, because, as we have found, extracts which are soluble in alcohol have proved to be only of slight efficacy.

Now we have found that by extracting the comminuted hearts or any parts of the heart of warm-blooded animals by means of water, or an organic solvent which may be soluble or insoluble in water, there are obtained, after the separation of the ballast substances, such as albumen and lipoids, extracts having an intensive heart-stimulating action. The extracts obtainable by our new process are intended to be used in the treatment of cardiac diseases.

The procedure for preparing the said extracts may be as follows: The parts of the organ are treated with water-soluble organic solvents and the aqueous extracts, obtained after expelling the organic solvent, are then treated with water-insoluble organic solvents in order to separate the lipoids from the water-soluble portions. Or the parts of the heart may be directly treated with water-insoluble organic solvents whereby the separation of the lipoids from the water-soluble portions is effected by a single separation.

Instead of the fresh, water-containing organs, desiccated organs may be used. In order to obtain active extracts, the desiccated organs may be treated, as above indicated, with an organic solvent to which water has been added, or they may be subjected to a treatment with an organic solvent followed by a further treatment with water.

We have found that extracts prepared by the aforedescribed new method are thermostable, for they can be sterilized, for instance by heating them up to 100° C., without impairing their efficacy. Moreover the new extracts are distinguished from the extracts already known by their high solubility in water and their insolubility in alcohol of a high-percentage. The efficacy of the extracts is not destroyed by making them alkaline or acid.

The following examples serve to illustrate our invention, but they are not intended to limit it thereto:

(1) The comminuted hearts or parts of the heart of cattle or pigs are sufficiently extracted with water and from the solutions, which may, if required, be enriched in a vacuum, the greater part of the ballast-substances is removed by adding alcohol or by freezing. The filtrate is desiccated in a vacuum and the lipoids or lipoid-like substances or other by-products which may be present are eliminated by means of alcohol of high percentage. The residual mass, which is insoluble in alcohol, is then dissolved in water. The resulting solution is free from albumen and contains the active hormones, it may be sterilized by heating or by the addition of a substance suitable for that purpose.

(2) 2 kilograms of comminuted hearts or parts of the heart of cattle are extracted by means of acetone. The acetonic solution is precipitated by freezing at 10° C. to 12° C. and the ballast substances which precipitate are filtered off. The filtrate is concentrated in a vacuum and the lipoids or lipoid-like substances floating in the aqueous extract are isolated by means of the known lipoid-extracting agents, such as methylene chloride or the like. The aqueous portion of the mass is almost entirely free from albumen and may be sterilized by heating it or by the addition of a substance suitable for this purpose. The lipoid extracts obtained after evaporation of the organic solvent can be freed from phosphatides by a treatment with acetone.

(3) 2 kilograms of comminuted hearts or parts of the hearts of cattle are extracted with ether. The aqueous layer is frozen out and the precipitating ballast substances are filtered off. After the filtrate has been evaporated to a syrupy consistency any phosphatides which may still be present are separated by means of acetone and the mass remaining after evaporation of the acetonic solution is taken up with water.

Any formation of acid which may possibly occur when the parts of the heart are stored for some time can be compensated, before the extraction, by adding an alkali until a neutral or weakly alkaline reaction is produced.

(4) 1 kilogram of comminuted and disiccated hearts or parts of the heart of cattle is extracted with ether. The parts of the organ, after being thus freed from the lipoids contained therein, are then extracted with water and the aqueous extract thus obtained is evaporated to a sirupy consistency. The extract can be further purified by digesting the sirupy mass with acetone of high strength, removing the separated phosphatides by filtration and evaporating the solution.

In the following claims the expression "hearts" is to be understood to comprise both the whole hearts and parts thereof, in a fresh, water-containing state or in a desiccated state, and the expression "solvent" to comprise water and water-soluble and water-insoluble organic solvents.

We claim:

1. Physiologically active extracts prepared from the hearts of warm-blooded animals containing the extractive from the hearts practically free from albumen, lipoids and other ballast substances and being thermo-stable, readily soluble in water, insoluble in alcohol of a high percentage and having an intensive heart-stimulating action.

2. Physiologically active extracts prepared from the hearts of warm-blooded animals, obtainable by treating the hearts with a solvent under a neutral to weakly alkaline reaction and freeing the portion containing the active extract from the ballast substances, containing the extractive from the hearts practically free from albumen, lipoids and other ballast substances and being thermo-stable, readily soluble in water, insoluble in alcohol of a high percentage and having an intensive heart-stimulating action.

3. Physiologically active extracts prepared from the hearts of warm-blooded animals, obtainable by treating the fresh, water-containing hearts with a solvent under a neutral to weakly alkaline reaction and freeing the portion containing the active extract from the ballast substances, containing the extractive from the hearts practically free from albumen, lipoids and other ballast substances and being thermo-stable, readily soluble in water, insoluble in alcohol of a high percentage and having an intensive heart-stimulating action.

4. Physiologically active extracts prepared from the hearts of warm-blooded animals, obtainable by treating the fresh-water-containing hearts with acetone under a neutral to weakly alkaline reaction and freeing the acetonic solution from the ballast substances, containing the extractive from the hearts practically free from albumen, lipoids and other ballast substances and being thermo-stable, readily soluble in water, insoluble in alcohol of a high percentage and having an intensive heart-stimulating action.

In testimony whereof, we affix our signatures.

WILLI LUDWIG.
OTTO SCHAUMANN.